United States Patent
Kim

(10) Patent No.: US 6,542,253 B1
(45) Date of Patent: Apr. 1, 2003

(54) METHOD FOR ADJUSTING AN OPTIMUM PRINTING SPEED

(75) Inventor: Sung-jae Kim, Kyonggi-do (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 602 days.

(21) Appl. No.: 08/998,781

(22) Filed: Dec. 29, 1997

(30) Foreign Application Priority Data

Dec. 27, 1996 (KR) .............................................. 96-74197

(51) Int. Cl.⁷ .............................................. G06K 15/00
(52) U.S. Cl. ........................................ 358/1.15; 358/1.5
(58) Field of Search ................................ 395/114, 115, 395/116; 358/1.1–1.9, 1.11–1.14, 1.18

(56) References Cited

U.S. PATENT DOCUMENTS

| 4,661,857 | A |   | 4/1987  | Kondo ........................ 358/439 |
| 5,170,210 | A | * | 12/1992 | Saruwatari .................. 399/44 |
| 5,210,823 | A | * | 5/1993  | Moroi ......................... 395/116 |
| 5,216,754 | A |   | 6/1993  | Sathi et al. ................. 358/1.16 |
| 5,297,876 | A | * | 3/1994  | Imagawa .................... 395/116 |
| 5,490,237 | A | * | 2/1996  | Zimmerman et al. ....... 395/114 |
| 5,528,375 | A |   | 6/1996  | Wegeng et al. ............. 358/296 |
| 5,537,517 | A | * | 7/1996  | Wakabayashi et al. ...... 395/115 |
| 5,579,447 | A |   | 11/1996 | Saigado ....................... 358/1.9 |
| 5,588,095 | A | * | 12/1996 | Dennis et al. ............... 395/115 |
| 5,634,090 | A |   | 5/1997  | Narukawa et al. .......... 358/1.16 |
| 5,668,937 | A |   | 9/1997  | Shimizu ...................... 358/1.16 |
| 5,687,302 | A |   | 11/1997 | Kawase ....................... 358/1.16 |

FOREIGN PATENT DOCUMENTS

EP    0 598 513 A1    5/1994

* cited by examiner

Primary Examiner—Gabriel Garcia
Assistant Examiner—King Y. Poon
(74) Attorney, Agent, or Firm—Robert E. Bushnell, Esq.

(57) ABSTRACT

Disclosed is a method and apparatus for adjusting an optimum printing speed. The method includes the steps of converting a print data into a data having a predetermined size unit; calculating the time required for transmitting the converted data to a printer according to a predetermined rule; and performing a preprocessing print for printing the received data by doing the printing environment recognition operation earlier as much as a transmission time during the converted data is received, thereby enhancing the printing speed so that the printer engine can start the print environment recognition operation earlier as much as the time for transmitting the data from a host computer to the printer.

15 Claims, 4 Drawing Sheets

METHOD FOR ADJUSTING AN OPTIMUM PRINTING SPEED

CLAIM OF PRIORITY

This application makes reference to, incorporates the same herein, and claims all benefits accruing under 35 U.S.C. §119 from an application for A Method For Adjusting an Optimum Printing Speed earlier filed in the Korean Industrial Property Office on Dec. 27, 1996 and there duly assigned Ser. No. 74197/1996.

FIELD OF THE INVENTION

The present invention relates to a method and apparatus for adjusting a printing speed, and particularly, to an improved method for achieving an optimum printing speed capable of realizing a quick printing by performing a print environment recognition operation in advance through driving a printer as fast as a data transmission time.

DESCRIPTION OF THE RELATED ART

Conventionally, the printing speed of a printer system is limited because of the time needed to perform a print environment recognition operation.

One type of print environment recognition operation is a printer warm-up occurring before the actual printing. A second type of a print environment recognition operation is a printer initialization occurring before the actual printing. For example, U.S. Pat. No. 5,216,754 for Determining the Complexity of a Page Prior to a Print Attempt to Sathi et al analyzes the quantity, size, geometry, and location of objects on a page prior to the printing of a page. U.S. Pat. No. 5,687,302 for a Method of Transferring Recording Data to Recording Device to Kawase determines beforehand the available memory capacity of an input device before printing. I have not seen a method or apparatus that performs a print environment recognition operation in an efficient manner so that the printing operation is not slowed down.

SUMMARY OF THE INVENTION

Therefore, it is an object of the present invention to provide an improved printing operation.

It is also an object to perform a printing operation enhancing the speed of a printer engine, by reducing a time required for recognizing a print environment of the printer engine.

It is yet another object to provide an improved method and apparatus for adjusting the printing speed.

It is also another object to provide a more efficient printing operation that efficiently determines the print environment recognition operation in printing a page of text.

To achieve these and other objects, a method for adjusting an optimum printing speed according to the present invention includes converting print data into data having a predetermined size unit; calculating the time required for transmitting the converted data to a printer according to a predetermined formula; and performing a preprocessing print for printing the received data by doing the printing environment recognition operation earlier by as much as a transmission time during the converted data is received.

Preferably, the step of performing the preprocessing print includes the steps of determining a printing amount of time; rendering the transmitted data continuously; and printing the rendered data by driving the printer engine after the printing amount of time elapses. Preferably, the predetermined formula is a time which is obtained by dividing the size value of the converted data by a transmission speed at between a host computer and the printer. Preferably, the printing amount of time is the transmission time. Preferably, the predetermined size unit is one page.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENTS

Figure 1:
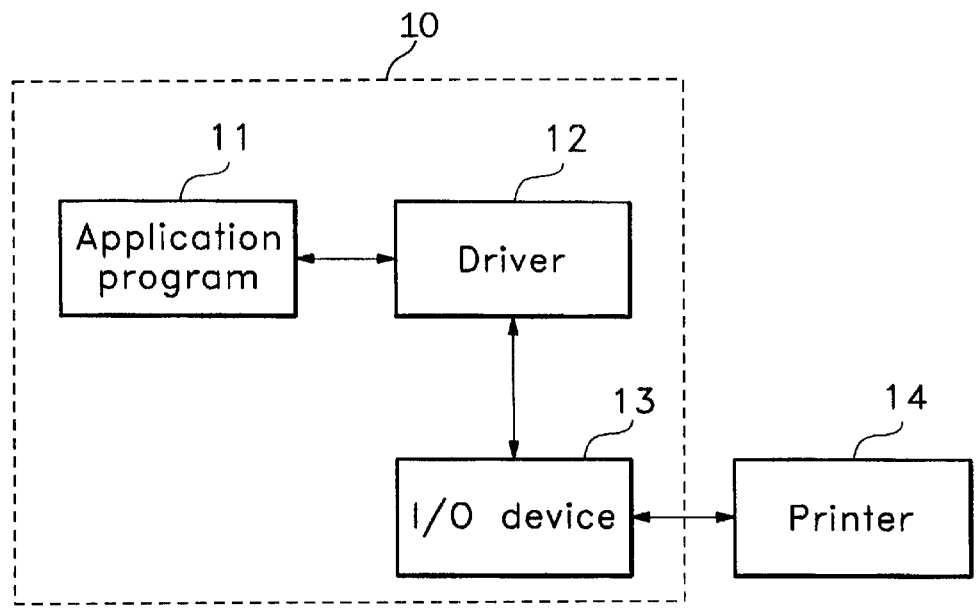
FIG. 1 is a block diagram illustrating a print environment.

First, a print environment shall be discussed. FIG. 1 is a block diagram illustrating a print environment. As shown in the drawing, the print environment includes an application program 11; a printer driver 12 for converting the image data generated by the application program 11 into print data which the printer can recognize; an input/data (I/O) device 13 for transmitting the print data; and a printer 14 which is connected to the I/O device and prints data corresponding to one (1) page by interpreting print data transmitted. The printer driver 12 can be a computer program residing in host computer 10.

Figure 2:
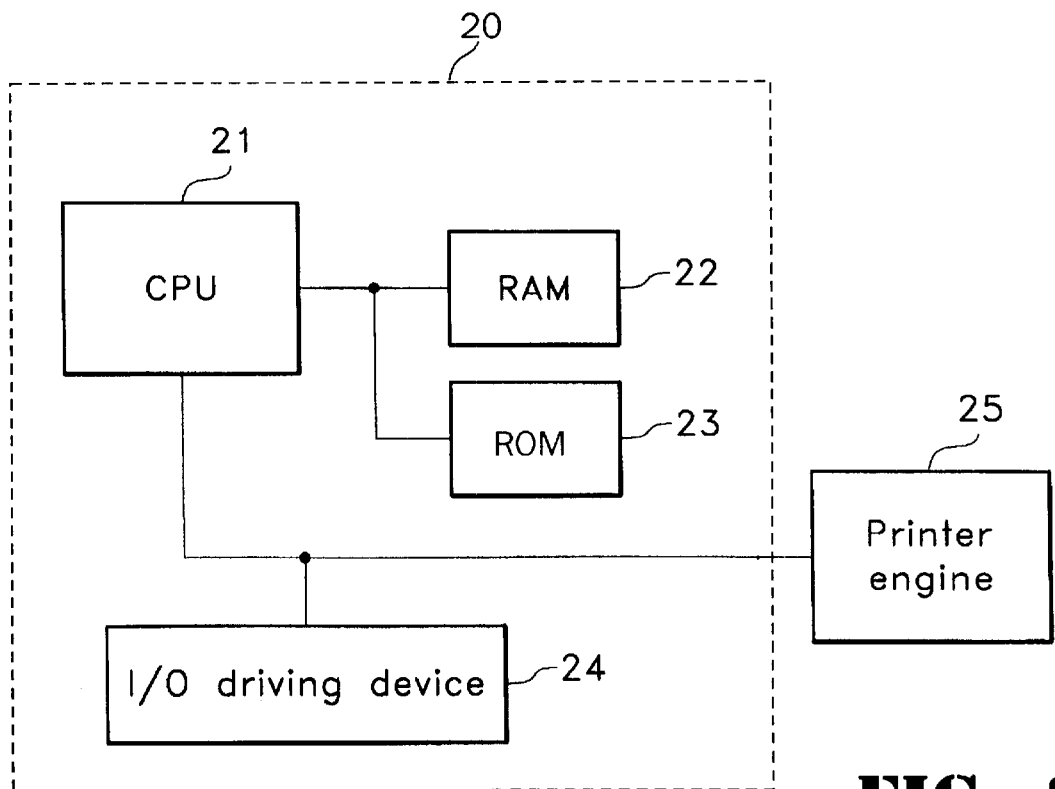
FIG. 2 is a block diagram illustrating a laser printer.

FIG. 2 is a block diagram illustrating a laser printer. As shown in the drawing, the laser printer includes a controller unit 20 for decoding the print data transmitted from a host computer 10 and for controlling the printing operation; and a printer engine 25 forming an image on a recordable medium according to the control of the controller unit 20. The controller unit 20 is composed of a central processing unit (CPU) 21; a RAM 22, a ROM 23; and an input/output (I/O) driving device 24.

The printing operation of the laser printer of FIG. 2 having the above-described structure will be explained as follows. First, the document created by the application program 11 is converted from image data into the print data which the printer 14 can recognize. This conversion is performed by the printer 12 provided in the host computer 10. After that, the print data is transmitted to a serial port or a parallel port of the printer 14 through the I/O device 13 of the host computer 10. The printer 14 receives the transmitted instruction, i.e., print data, and converts the portion of the print data corresponding to one page into a bitmap format which the printer engine 25 can recognize. A print signal is then transmitted to the printer engine 25. The printer engine 25 recognizes the present print environment for printing in an optimum condition and determines a fixing temperature of a developing machine according to the print environmental condition (such as a temperature, a humidity, etc.). After that, the printer engine 25 fixes a toner of the developing machine on a recordable medium by the electric pressure using a driving circuit. At this time, after the printer enables the printer engine 25 to recognize the print environment, the actual printing operation is commenced. In other words, it is necessary to warm up the printer engine 25. The phrase "printing environment" is used interchangeably with the phrases "engine environment" and "print environment."

Accordingly, because the printer needs to enable the printer engine 25 to recognize the print environment before starting the printing operation, the actual time for printing becomes delayed depending upon the time for performing the print environment recognition operation by the printer engine 25, thereby decreasing the printing speed. Moreover, in the case where multiple pages need to be printed one at a time, because the print environment needs to be recognized whenever printing is performed, the print speed appears to be very slow to users.

In the case of continuous printing of the multiple pages, as the print environment which has previously been recognized is continuously used, the decrease of the printing speed is less pronounced. However, when the documents to be printed become more complicated then the amount of the data to be transmitted for each page becomes large. Accordingly, the printer engine 25 can be suspended for each page to be printed. Or, it can be suspended due to the amount of the data for each page, if the input buffer of the printer is small. As it is necessary to have time for performing the print environment recognition operation, the printing speed can decrease.

The time for transmitting data can be calculated using a characteristic of the printing operation as follows. In the case that a user wants to print the image data in an application program 11, a printer driver 12 of a host computer 10 converts the image data to be printed into print data which a printer 14 can recognize and transmits the print data to the printer 14. At this time, the printer driver 12 can recognize an overall size of the instruction of a page which is to be printed. Moreover, by selecting an input/output (I/O) device 13 of the host computer 10, the print data is transmitted to the printer 14. In this case, as the transmission speed is already known, it is possible for the printer driver 12 or the printer 14 to look for the amount of print data corresponding to one page. In other words, it is possible to know the time required for transmitting the print data corresponding to one page from the host computer 10 to the printer 14, when the amount of print data corresponding to one page is divided by the transmission speed. The transmission time can be calculated using the following equation:

$$\text{Transmission time} = \frac{\text{amount of print data corresponding to one page}}{\text{transmission speed}}$$

A simple example of the use of the above equation can be shown. If the "amount of print data corresponding to one page" equals 100,000 bytes, and the "transmission speed" equals 28,000 bytes per second, then the "transmission time" shall equal 3.47 seconds.

Figure 3:
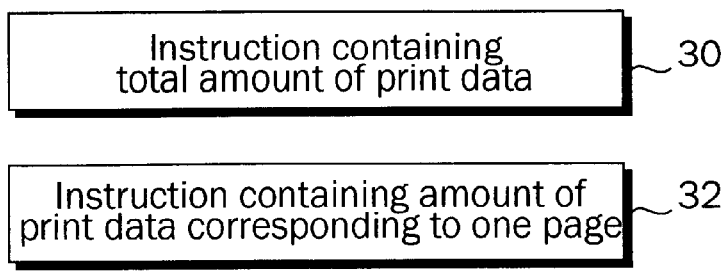
FIG. 3 is an instruction format illustrating an instruction informing a printer of a data size corresponding to one page.

In the present invention adopting the above-identified equation, in the case that the printing operation is performed starting from the host computer 10, the printer driver 12 calculates the amount of print data corresponding to one page and informs the printer 14 of the calculated amount. The conventional technologies use a printer that performs the print environment recognition operation of the printer engine 25 upon receiving actual print data. However, the printer 14 of the present invention calculates the transmission time using the above-identified equation after receiving from the printer driver 12 the calculated amount of print data corresponding to one page. The printer 14 uses the amount of print data corresponding to one page along with the established value of the transmission speed, thereby performing the print recognition operation earlier by as much as the calculated transmission time. For this purpose, a new instruction 32 for informing the printer 14 of the amount of print data corresponding to one page shown in FIG. 3 is added to the printing instruction 30 used in the conventional technologies.

In other words, in the conventional technologies the instruction 32 was not used. The conventional technologies only used instruction 30.

Figure 4:
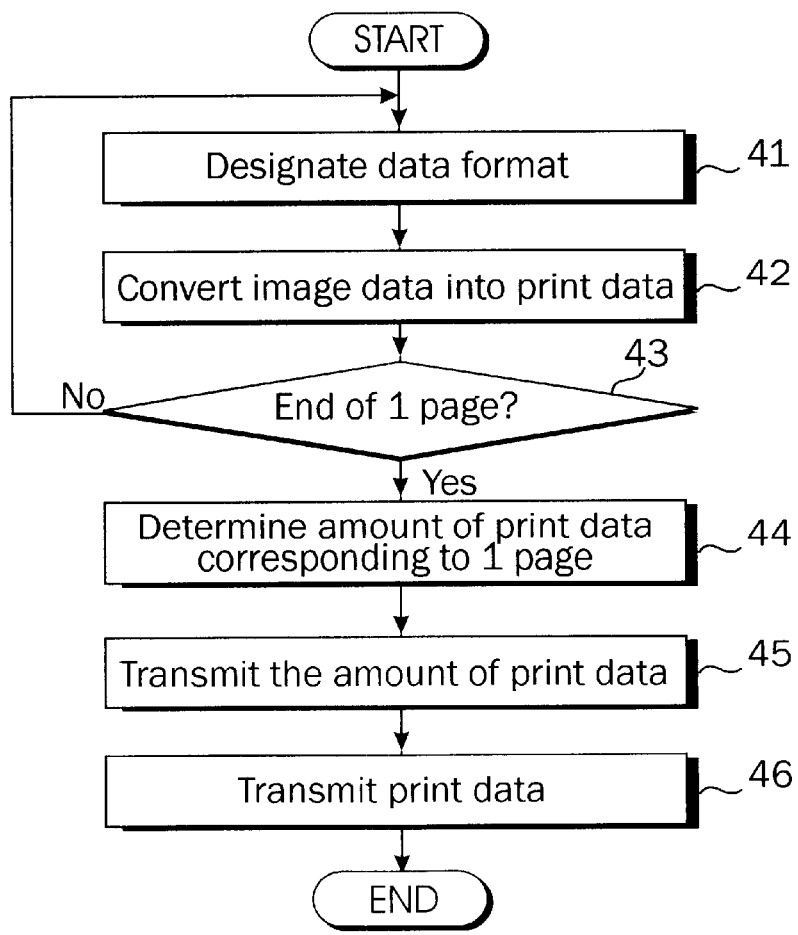
FIG. 4 is a flowchart illustrating a method for processing the print data in a printer driver of a host computer according to the present invention.
Figure 5:
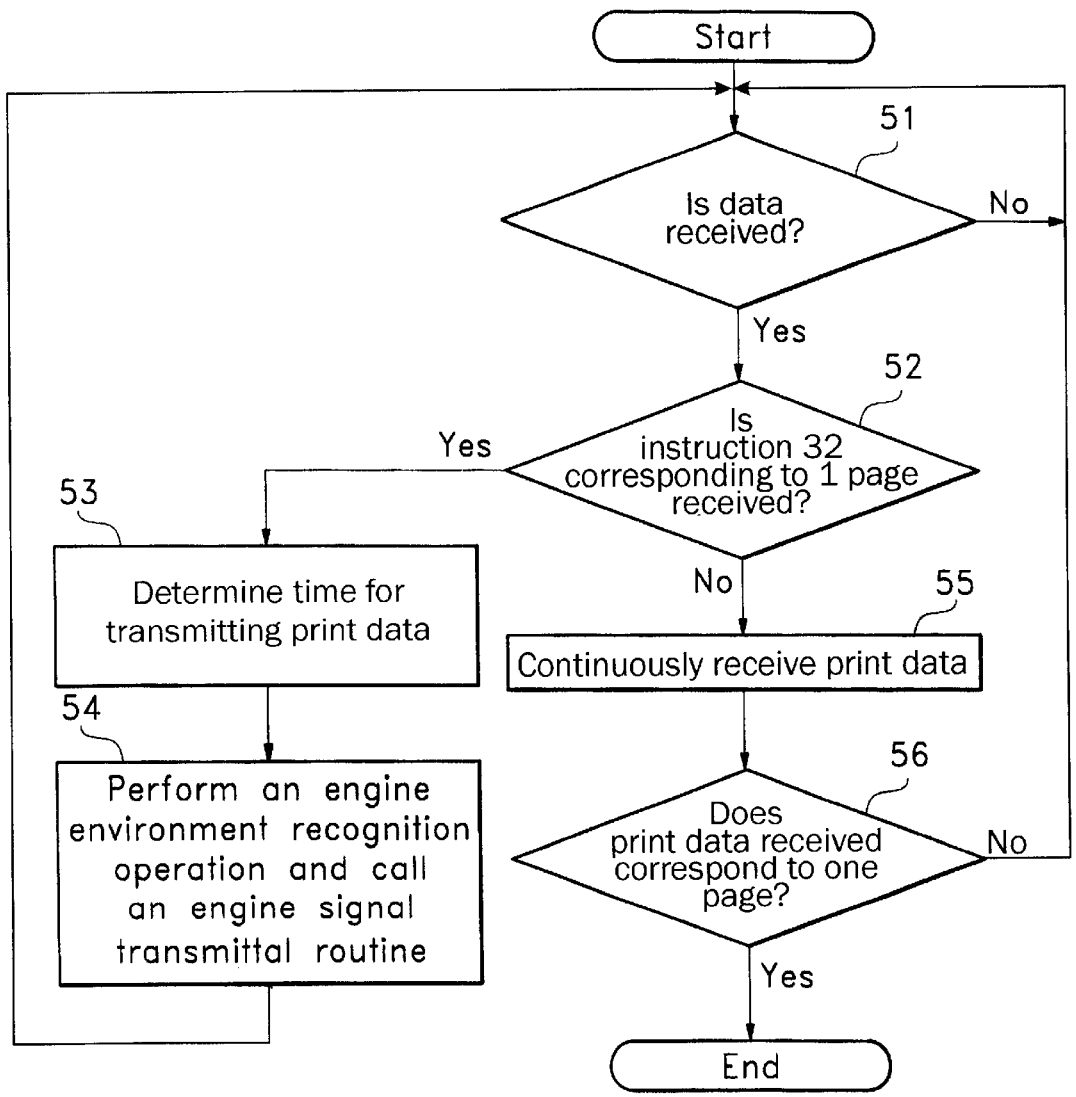
FIG. 5 is a flowchart illustrating a method of performing a preprocessing print according to the present invention.
Figure 6:
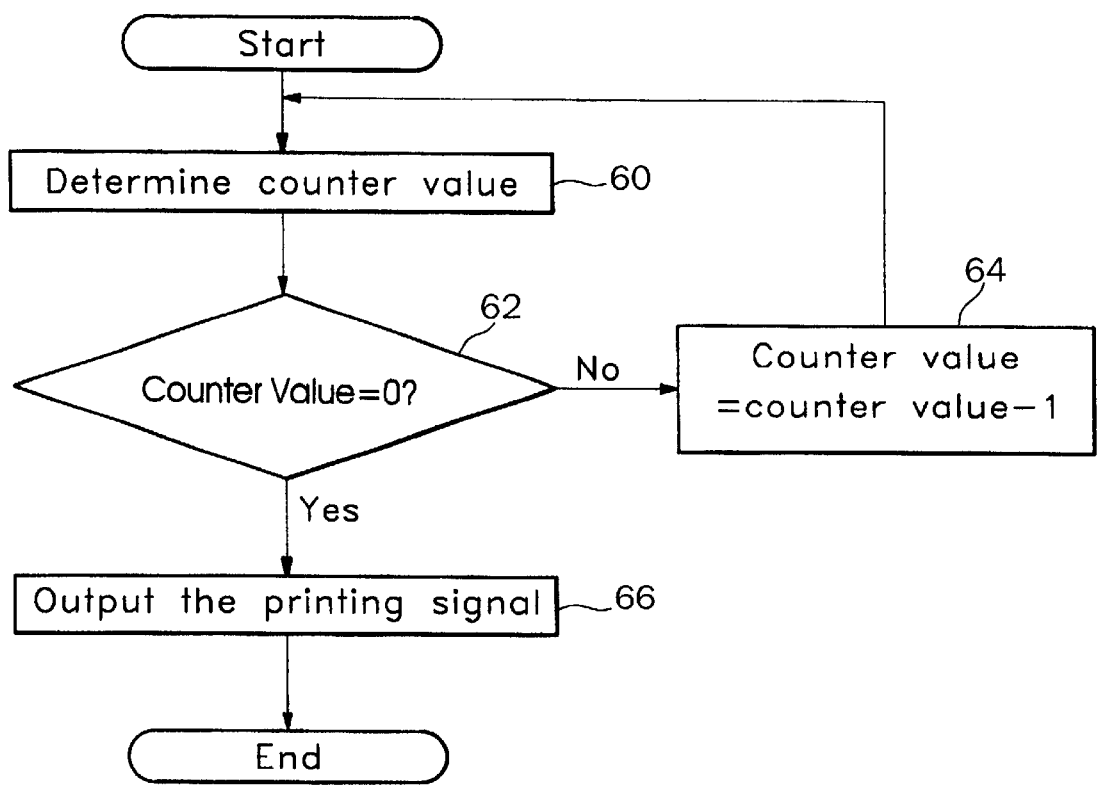
FIG. 6 is a flowchart illustrating a process for controlling an engine signal transmittal according to the present invention.

FIG. 4 is a flowchart illustrating a method for processing the print data in the printer driver 12 of the host computer 10 according to the present invention, and FIG. 5 is a flowchart illustrating a method of performing a preprocessing print according to the present invention. In addition, FIG. 6 is a flowchart illustrating a process for controlling an engine signal transmittal according to the present invention.

The printing order will be explained, with reference to the drawings. First, a document is created by an operator using application program 11 in host computer 10. When the document is to be transmitted to the printer 14 attached to the host computer 10, the printer driver 12 receives the image data to be printed from the application program 11 and processes the image data, as shown in the flowchart of FIG. 4. In other words, at step 41 the printer driver 12 designates a format of the data to be printed. Then a step 42, the printer driver 12 converts the image data into print data. The printer 14 can recognize and print the print data. The conversion of the image data into the print data is repeatedly performed until there is one page of print data. At step 43, the data corresponding to one page are all converted. Then at step 44, amount of print data corresponding to one page is determined. Then at step 45, the printer driver 12 processes the print data corresponding to one page to form the instructions 30 and 32 shown in FIG. 3, and transmits instructions 30 and 32 to the printer 14 through the I/O device 13. At step 46, the printer 12 transmits the print data to be printed to the printer 14 through the I/O device 13.

Refer now to FIG. 5, which illustrates a method of performing a preprocessing print according to the present invention. As shown in FIG. 5, the printer 14 performs the preprocessing printing. At step 51, the printer 14 determines whether it has received data from the host computer 10. If printer 14 has received data, then step 52 is performed. At step 52, the printer 14 determines whether the data received is the instruction 32 or is the print data. If printer 14 receives instruction 32 then step 53 is performed at step 53, the data transmission time is calculated by the printer driver 12 using the above-identified equation with the value of the amount of print data corresponding to one page included in the page size instruction 32 and the established transmission speed of signals converted between the host computer 10 and the printer 14. Also at step 53, the calculated transmission time is stored in a timer (not illustrated in the drawing) provided in the printer 14. The calculated transmission time is used in conjunction with an engine signal transmittal routine shown in FIG. 6. At this time, the transmission time is calculated by the printer driver 12 of the host computer 10 and then the transmission time is conveyed to the printer 14.

Before the transmission time elapses, the step 54 is performed. At step 54, the engine signal transmittal routine of FIG. 6 is called so that the printer engine 25 can perform the print environment recognition operation before the transmission time elapses. In other words, the printer engine 25 is instructed, that the print environment recognition operation should be performed earlier by as much as the transmission time. Thus, the print environment recognition operation (which can include a printer warm-up, a printer initialization, a sensing of temperature, a sensing of humidity, etc.) is performed before the transmission time elapses. Suppose the transmission time is 3.47 seconds and a printer warm-up time is 5.0 seconds. Then, using conventional technology, the print data would begin to be recorded onto a recordable medium after 8.47 seconds elapse. Thus, a printer preparation time using conventional technology can be said to be 8.47 seconds. However, using the present invention, the print data would begin to be recorded onto the recordable medium after 5.0 seconds. Thus the printer preparation time for the present invention can be said to be 5.0 seconds. One way in which the present invention accomplishes the savings in time is by simultaneously performing the printer warm-up and performing the transmission of print data to the printer. Conversely, the conventional technologies do not simultaneously perform the printer warm-up and the transmission of print data to the printer.

Referring to FIG. 6, the operation of the engine signal transmittal routine is explained. A counting operation is performed during the time corresponding to the transmission time stored in the timer. When the value of the counter corresponds to the transmission time, the printing signal is transmitted to the printer engine 25. At step 60, the counter value is determined. Next, at step 62, the counter value is compared to the value zero. If the counter value at step 62 does not equal zero, the step 64 is performed. At step 64, the value of the counter is decreased by one. Then step 60 is performed again, to determined the current value of the counter. If the counter value at step 62 does equal zero, then this means that the value of the counter corresponds to the transmission time. Thus, step 66 is performed. At step 66, the printing signal is transmitted to the printer engine 25, after which the printer engine 25 can print the print data on a recordable medium. If the result of the determination, of step 52 is that the instruction 32 is not received, then step 55 is performed. At step 55, print data which is transmitted is continuously received until the transmitted print data correspond to one page.

At step 56, an amount of print data has been received which correspond to one page. At this time, as shown in FIG. 6, at step 66 when the value of the counter corresponds to the transmission time (that is, when the value of the counter becomes zero), the printing signal is transmitted to the printer engine 25 and the print data which has received and rendered until then is printed. In other words, while the timer performs the counting operation to instruct the warming up of the printer engine 25, the printer 14 receives the print data to be printed and performs rendering. The printer 14 warms up the printer engine 25, and the print data is transmitted to the printer engine 25 to perform the printing operation.

A method is described above to overcome the problem of a printing time being delayed due to the time required to perform the environment recognition operation of the printer engine 25. When the printing signal is received to the printer engine 25 when performing the printing operation, the host computer 10 transmits the data transmission time and enables the printer engine 25 to perform the print environment recognition operation. Thus, the print environment recognition operation is performed before all print data is transmitted from host computer 10, thereby saving time. As the delayed time is removed, users can perform the printing operation more quickly.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for printing at an optimum printing speed, comprising the steps of:

converting image data from a host computer into print data having a predetermined size;

calculating a transmission time required for transmitting the print data to a printer from said host computer according to a predetermined formula comprising said predetermined size of the print data divided by a predetermined transmission speed of signals transmitted from said host computer to said printer;

determining an optimum printing speed according to said transmission time, said determining comprising:

identifying a printer preparation period according to said transmission time, said printer preparation period corresponding to a period of time for preparing said printer to form an image on the recordable medium;

continuously sending the print data from said host computer to said printer while said printer preparation period is elapsing; and driving a printer engine of said printer when said printer preparation period elapses;

performing a print environment recognition operation at a print recognition time, said print recognition time being determined in accordance with said transmission time, said print environment recognition operation being performed while the print data are being received by said printer, said print environment recognition operation sensing information to be used to prepare said printer to record the print data on a recordable medium; and recording the print data onto the recordable medium at the optimum printing speed.

2. The method of claim 1, further comprising said print environment recognition operation including a sensing of temperature and humidity.

3. The method of claim 2, further comprising said predetermined size of the print data corresponding to one page.

4. An apparatus printing at an optimum printing speed, comprising:

a converter unit converting image data into print data having a predetermined size;

a calculating unit calculating a transmission time required for transmitting the print data to a printer from a host computer by dividing the predetermined size of the print data by a predetermined transmission speed of signals transmitted from said host computer to said printer;

a first processing unit determining an optimum speed according to said transmission time;

a second processing unit performing a print recognition operation at a print recognition time, said print recognition time being determined in accordance with said transmission time, said print recognition operation being performed while the print data are being received by said printer, said print environment recognition operation sensing information to be used to prepare said printer to record the print data on a recordable medium, said second processing unit identifying a printer preparation period according to said transmission time, said printer preparation period corresponding to a period of time for preparing said printer to form an image on the recordable medium, said second processing unit continuously sending the print data from said host computer to said printer while said printer preparation period is elapsing, said second processing unit driving a printer engine of said printer when said printer preparation period elapses; and said printer recording the print data onto the recordable medium at the optimum printing speed.

5. The apparatus of claim 4, further comprising said print environment recognition operation including a sensing of temperature and humidity.

6. The apparatus of claim 5, further comprising said predetermined size of the print data corresponding to one page.

7. A method for printing at an optimum printing speed, comprising the steps of:

determining whether data are received by a printer;

determining whether data received by said printer comprise instruction data containing a value corresponding to a predetermined size of print data;

determining a transmission time required for transmitting the print data having said predetermined size to said printer from a host computer, according to the instruction data;

receiving the print data to said printer, the print data to be recorded on a recordable medium at an optimum speed;

performing a print engine environment recognition operation at a print recognition time, said print recognition time being determined in accordance with said transmission time, said print engine environment recognition operation being performed while the print data are being received by said printer, said print environment recognition operation sensing information to be used to prepare said printer to record the print data on the recordable medium; and calling a print engine signal transmittal routine to print the data, said print engine transmittal routine comprising the steps of:
  determining a counter value;
  incrementally decreasing said counter value until said counter value equals zero; and
  outputting a printing signal to print the print data having said predetermined size.

8. The method of claim 7, further comprising said print environment recognition operation including a sensing of temperature and humidity.

9. The method of claim 8, further comprising said predetermined size of the print data corresponding to one page.

10. A method of transferring data from a host computer to a printer, comprising:

determining a transmission time required for transmitting the data from the host computer to the printer;

transmitting the data from the host computer to the printer in accordance with said transmission time; and commencing a print environment recognition operation in the printer at a print recognition time, said print recognition time being determined in accordance with said transmission time, said print environment recognition operation being performed during said transmitting of the data, said print environment recognition operation sensing information to be used to prepare the printer to record data on a recordable medium;

said determining of said transmission time being performed according to a predetermined rule, said commencing of said print environment recognition operation being performed before the expiry of said transmission time, said transmission time being calculated in the host computer and being transmitted to the printer before the data is transmitted.

11. The method of claim 10, further comprising the data corresponding to one unit of print data that has been converted into data having one or more such units of predetermined size.

12. The method of claim 11, further comprising each such unit corresponding to one page of data.

13. The method of claim 12, further comprising said transmission time being determined by dividing said predetermined size by a data transmission speed between the host computer and the printer.

14. An apparatus for adjusting optimum printing speed, comprising:

a host computer calculating a transmission time corresponding to a length of time required to transmit data to a printer according to a predetermined rule, said printer having a print engine and receiving the data transmitted from said host computer, a printer preparation period being in accordance with said transmission time and corresponding to a period of time for preparing said printer to form an image on a recordable medium, said host computer transmitting the data to said printer while said printer preparation period elapses, said print engine being driven when said printer preparation period elapses, said host computer transmitting said length of time and the data to the printer, the printer being adapted to commence a print environment recognition operation at a print recognition time, said print recognition time being determined in accordance with said transmission time, said print environment recognition operation being commenced before the expiry of said length of time, said print environment recognition operation sensing information to be used to prepare said printer to record data on the recordable medium.

15. The apparatus of claim 14, further comprising said print environment recognition operation including a sensing of temperature and humidity.

* * * * *